Figure 1:
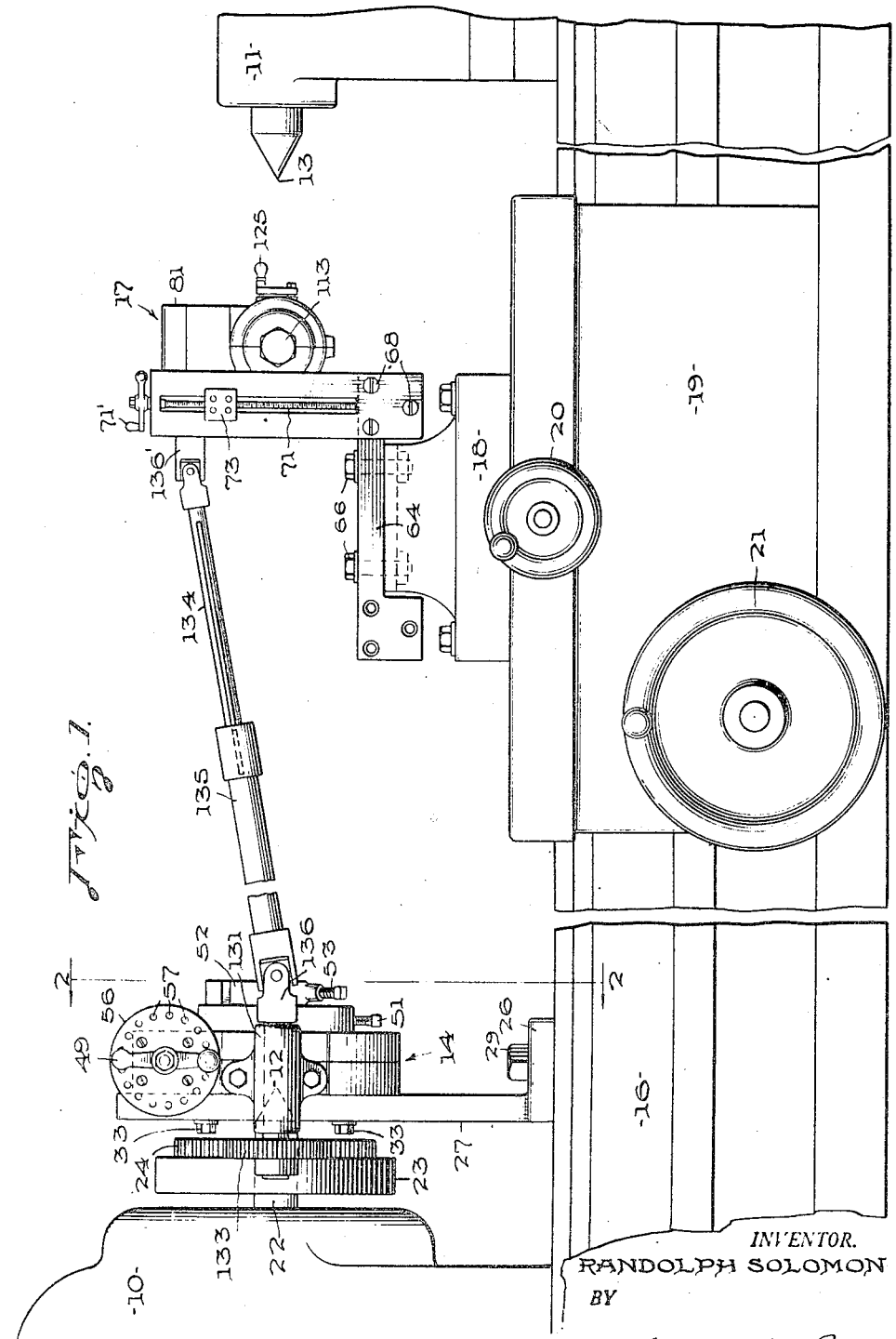

INVENTOR.
RANDOLPH SOLOMON

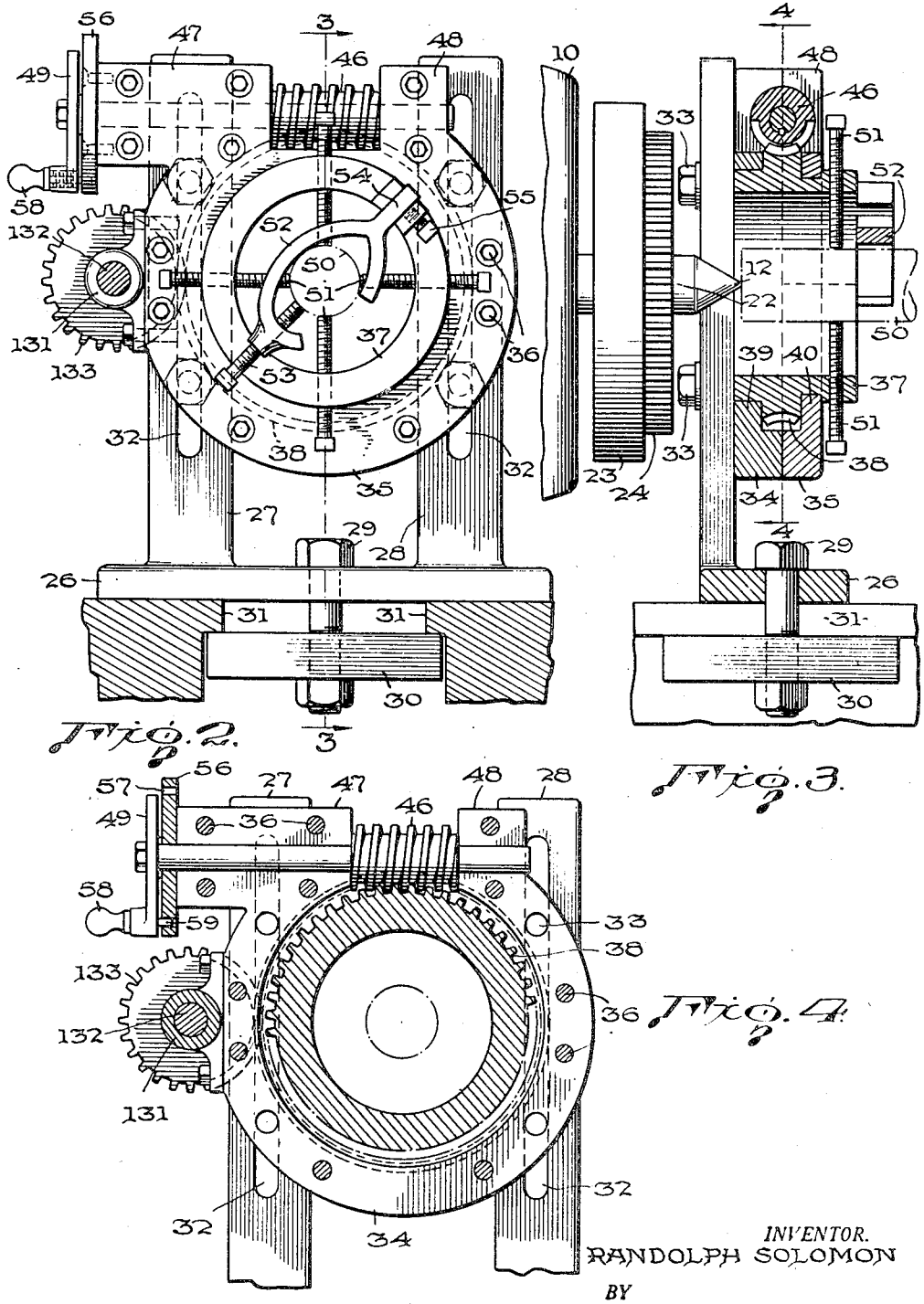

March 14, 1950 R. SOLOMON 2,500,880
MILLING ATTACHMENT FOR LATHES
Filed Aug. 17, 1948 5 Sheets-Sheet 3
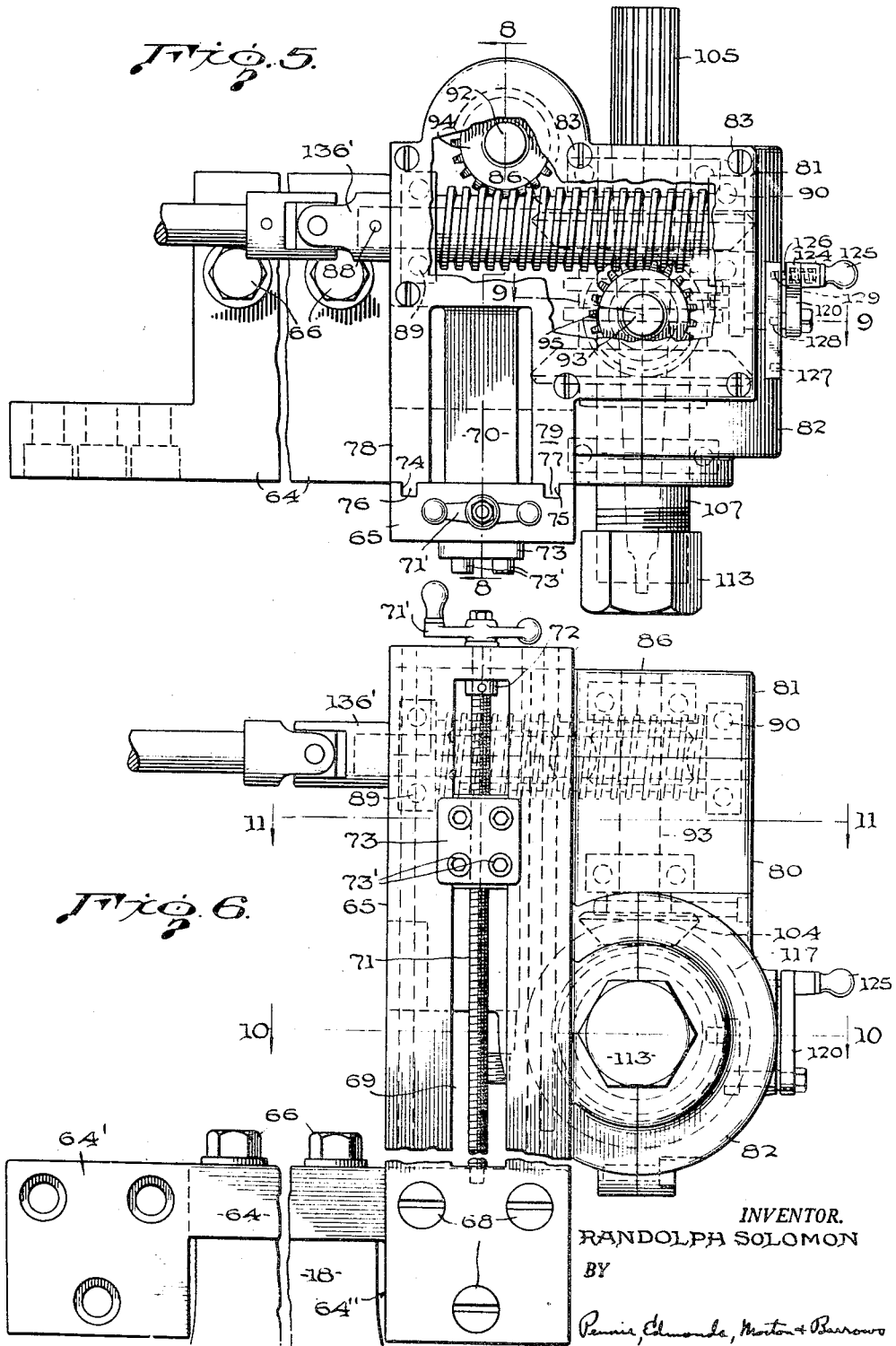

March 14, 1950 R. SOLOMON 2,500,880
MILLING ATTACHMENT FOR LATHES
Filed Aug. 17, 1948 5 Sheets-Sheet 4
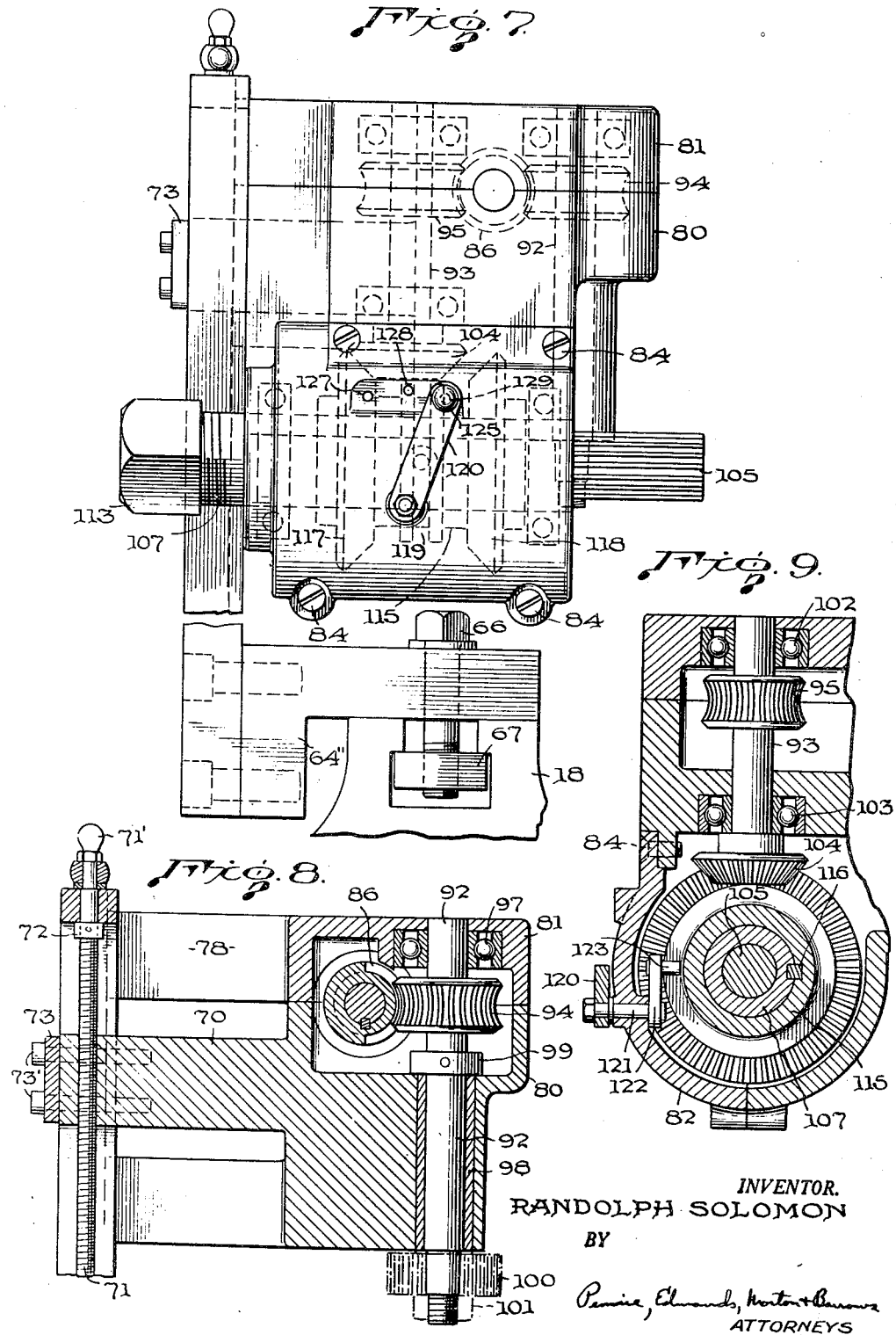
INVENTOR.
RANDOLPH SOLOMON
BY
*Pennie, Edmonds, Morton+Barrows*
ATTORNEYS March 14, 1950

R. SOLOMON 2,500,880

MILLING ATTACHMENT FOR LATHES

Filed Aug. 17, 1948

5 Sheets-Sheet 5

INVENTOR.
RANDOLPH SOLOMON
BY
Pennie, Edmonds, Morton + Burrows
ATTORNEYS

Patented Mar. 14, 1950

2,500,880

UNITED STATES PATENT OFFICE 2,500,880

MILLING ATTACHMENT FOR LATHES

Randolph Solomon, Washington, D. C., assignor of one-half to Edward Stewart, Washington, D. C.

Application August 17, 1948, Serial No. 44,737

24 Claims. (Cl. 90—15.1)

This invention relates to metal working apparatus and more particularly to attachments for lathes which will enable milling operations such as gear cutting, milling out keyways and slots, flat milling, etc., to be performed thereon.

In most machine shops it is desirable to include among the many machines both lathes and milling machines, but in many, due to restrictions of an economical nature and to limitations of available work space, it has been found desirable if possible to eliminate the need for separate milling machines. For instance, in small machine shops the expense of relatively high-cost milling machines is not warranted because of the small amount of milling work it may be necessary to perform. Also, in some machine shops, for example those aboard ships, the limitations with respect to working space are very pronounced and it is often found that there is just not room enough for the many varied machines necessary to a complete machine shop.

Heretofore, attachments have been proposed which would enable standard milling operations, such as those set forth above, to be performed on the usual lathe. However, nearly all of them have been open to the objections of being, in part at least, permanently attached to the lathe so that the lathe permanently is altered, or such that they require auxiliary driving means.

The present invention contemplates a milling attachment for lathes which is of relatively simple structure and readily mounted upon and dismounted from a lathe. A suitable means for connecting the attachment to the driving means of the lathe obviates the necessity of having auxiliary driving means to supply the attachment with driving power.

More specifically the present invention contemplates a steady-rest adjustably mounted on a lathe bed between the headstock and tailstock and having incorporated therein means for indexing and steadying the work piece which is to be held between the center of the headstock and the center of the tailstock, and also a bearing for supporting the means for transmitting the operating power from the face plate of the lathe to a milling tool carrier. The invention also includes the tool carrier which is removably mounted on the compound or tool rest of the longitudinally movable carriage of the lathe. This tool carrier is adapted to receive gear cutters, end mills or keyway cutters, to be used separately. Being mounted on the tool rest and carriage of the lathe, the tool carrier of the milling attachment therefore necessarily is adjustable both transversely and longitudinally of the lathe. Both the steady-rest and the tool carrier are vertically adjustable and are adapted for mounting on any standard lathe bed and thus may be used on various standard lathes of different sizes where the distances from the lathe bed to the centering spindles may be different.

Means for driving the various milling tools which are to be held in the tool carrier comprises a gear securely attached to the face plate of the lathe which drives a second gear mounted on the drive shaft of the attachment supported by the aforementioned bearing means of the steady-rest. This drive shaft is connected with the drive shaft of the tool carrier by means of a telescopic shaft having universal couplings at each end. This type of connecting means allows for a change in relative position of the steady-rest and tool carrier in any direction.

As both the steady-rest and tool carrier are light in structure any may be easily and readily mounted and removed from the lathe, and when removed leave no parts remaining on the lathe to interfere with the normal functioning thereof, they provide distinct advantages over the apparatus proposed in the prior art.

The apparatus of the present invention will be further and more specifically described in connection with the accompanying drawings which show one embodiment of the invention but are not to be construed as limiting its scope except to the extent set forth in the appended claims.

Figures 10, 11:
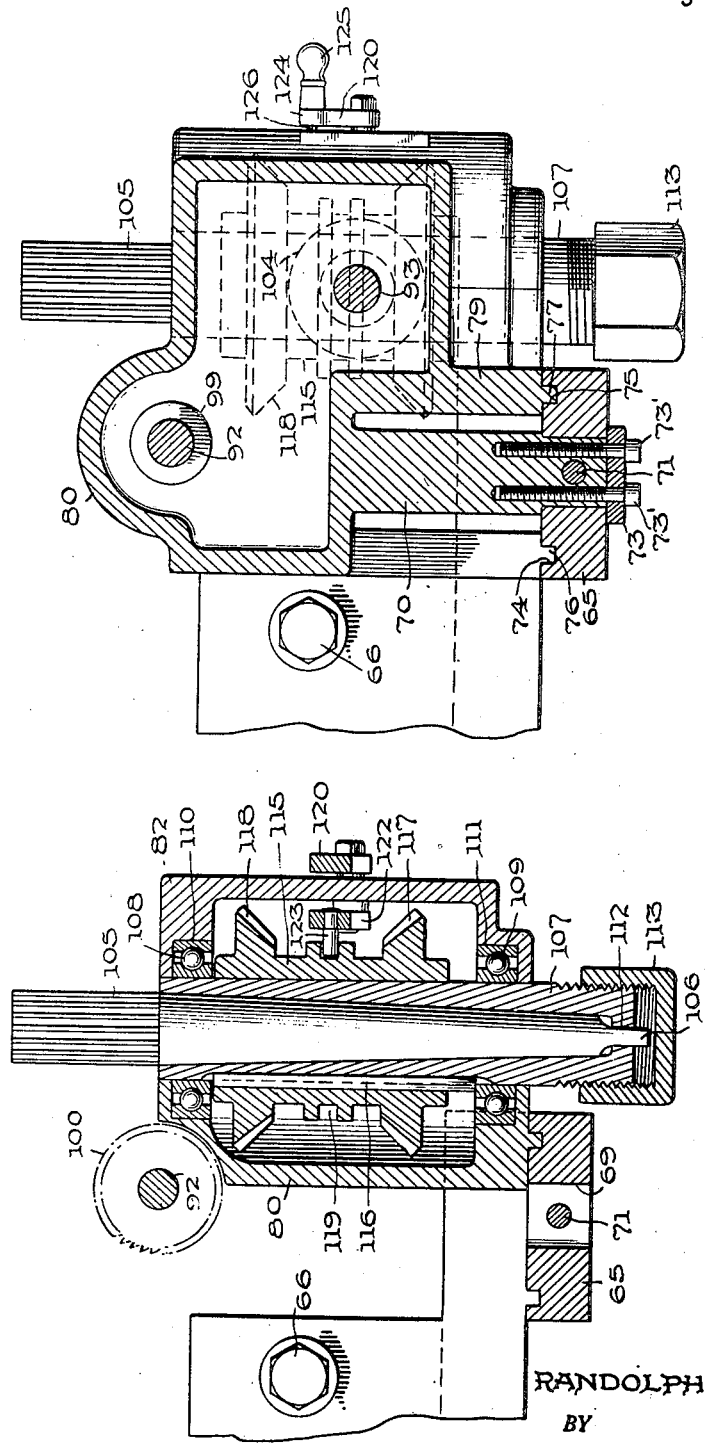

In the drawings:

Fig. 1 is an elevational view showing a portion of a standard lathe having mounted thereon the apparatus of the present invention, Fig. 2 is an elevational view of the steady-rest taken along line 2—2 of Fig. 1, Fig. 3 is a vertical sectional view of the steady-rest taken along line 3—3 of Fig. 2, Fig. 4 is a partial vertical sectional view of the steady-rest taken along line 4—4 of Fig. 3, Fig. 5 is a plan view of the milling tool carrier partially cut away to show the driving worm and worm gears, Fig. 6 is a front elevational view of the tool carrier, Fig. 7 is a side elevational view of the tool carrier taken from the right side of Fig. 6, Fig. 8 is a vertical sectional view of the tool carrier taken along line 8—8 of Fig. 5, Fig. 9 is a partial vertical sectional view of the tool carrier taken along line 9—9 of Fig. 5, Fig. 10 is a horizontal sectional view of the tool carrier taken along line 10—10 of Fig. 6, and showing more clearly the mounting of an end mill within the tool carrier, and Fig. 11 is a horizontal sectional view of a tool carrier taken along line 11—11 of Fig. 6.

Referring to the drawings, Fig. 1, shows a portion of a standard lathe having a headstock 10 and a tailstock 11, with centers 12 and 13 respectively, between which a work piece may be held. A steady-rest member, indicated generally by the numeral 14, of the milling attachment apparatus of the invention is removably mounted upon the bed 16 of the lathe, while the tool carrier, indicated generally by the numeral 17, is removably mounted on the lathe compound or tool rest 18, which is carried by the lathe carriage 19 and is adjustable thereon transversely of the lathe bed by the usual lead screw and crank 20. The tool carriage 19 is adjustable longitudinally along the lathe bed through the medium of usual gearing mechanism (not shown) and crank 21. The lathe spindle 22 normally carries a face plate 23 which, when the lathe is being used for milling operations, carries on its outer face a circular gear wheel 24 secured thereto against relative rotation and connected in a manner hereinafter described to means in the tool carrier for driving the milling tool or cutter carried thereby.

The supporting and indexing portion of the steady-rest is carried by a vertical supporting member comprising a horizontally extending base portion 26 and vertically extending arms 27 and 28. The supporting member is mounted on the lathe bed by a bolt 29 passing through its horizontal portion and through a block 30 which readily fits beneath inwardly extending flanges 31 of the bed. The vertical arms of the supporting member have elongated slots 32 through which bolts 33 pass to adjustably secure the supporting and indexing portion of the steady-rest in the desired vertical position. The work supporting and indexing portion of the steady-rest comprises essentially two annular plate-like members 34 and 35 adapted to engage one another face to face and to be held in such position by bolts 36. Mounted within members 34 and 35 is a horizontally extending cylindrical member 37 having an outwardly-extending portion of its periphery in the form of a worm gear 38. The cylindrical member is held in place within the members 34 and 35 by the worm gear portion which is abutted along its side faces by flanges 39 and 40 of the annular plate-like members. The mounting of the cylindrical member is such that it may be rotated within the supporting and indexing portion of the steady-rest, the members 34 and 35 acting as bearings therefor. A worm 46 is journaled above the worm gear in upwardly extending portions 47 and 48 of the annular supporting members 34 and 35. The worm has mounted on one end a crank 49 by which it may be rotated and in turn rotate the cylindrical work-supporting portion of the steady-rest by engagement with the worm gear portion extending from its periphery.

A work piece 50 which is shown in dotted lines in Figs. 2 to 4 and upon which a milling operation is to be performed, is mounted and centered in the lathe between its head and tail centers after the steady-rest has first been secured in position by means of its mounting members as described. Radially-extending set screws 51 are carried at one end by the cylindrical supporting members, and after the work piece has been properly centered in the lathe, are taken up to engage the surface of the work piece to give further support to it. The set screws will rotate with the cylindrical supporting member and the work piece and their engagement with the surface of the work piece therefore will in no way be subject to slippage.

A dog 52 of standard form having a set screw 53 in one end and an extending tail portion 54 at the other end is placed upon the work piece, its tail end placed in a recess in the peripheral end face of the cylindrical supporting member and is firmly secured to the work piece by the tightening up of its set screw. Another set screw 55 mounted in the cylindrical supporting member adjacent the receiving recess for the tail of the dog is then taken up to securely retain the tail of the dog therein. Thus, when the cylindrical supporting member is rotated by means of the worm and its own worm gear portion the work piece will be similarly rotated.

Suitable indexing mechanism is provided for accurately indexing the work piece during the milling operations to be performed on it. This mechanism includes an indexing disc 56 such as is used on standard milling machine dividing heads, rigidly secured to the front or outer face of the upwardly extending portion 47 of supporting members 34 and 35 by suitable screws or bolts as shown in Fig. 2. The indexing disc has a central opening to allow it to be placed in position over the end of the worm shaft. Also the disc has a series of perforations 57 of any desired number formed in it and positioned concentrically about the axis of the worm shaft, those shown in Fig. 1 of the drawings being only representative and in no way limiting. The crank handle 58 has a pin 59 extending axially from its base through the end of the crank and adapted to be received by any one of the series of perforations in the indexing disc. The handle pin is spring mounted within the handle end of the worm crank so that when it is desired to rotate the worm the handle may be drawn outwardly from the crank and the pin disengaged from the indexing disc. Upon reaching a new position the handle is released and its pin end is spring urged into a perforation of the indexing disc, thus securing the crank and worm from further rotation until it is again desired to index the work piece. Through such rotation of the crank, the worm, the cylindrical work supporting member and the dog, the work piece is accurately and readily indexed.

The ratio between the worm and worm gear may be whatever is desired, though it is believed that a one to forty ratio will be found most suitable and perhaps most readily usable in the majority of milling operations to be performed.

The tool carrier portion of the present milling apparatus, which has been indicated generally in Fig. 1, by the numeral 17, is more specifically disclosed in Figs. 5 to 11 and is adjustably supported on the compound or tool rest 18 of the lathe carriage 19 by supporting members 64 and 65. The base supporting member 64 is removably mounted on the tool rest section of the lathe carriage by bolts 66 passing through it and through block 67 which readily fits beneath inwardly-extending flanges of the tool rest 18 as shown most clearly in Fig. 7. A vertical supporting member 65 is affixed to either of two downwardly extending extensions 64' and 64'' of member 64 by means of countersunk bolts or screws 68 passing through it into said member 64. As shown in Figs. 1 and 6 the vertical supporting member 65 may be affixed either to the extension 64' or to the extension 64'' to give broader latitude to the longitudinal adjustment of the tool carrier, particularly when that portion of the work piece which is to be subjected to a milling operation lies closely adjacent one of its ends near the head or tail stock of the lathe.

The vertical supporting member 65 for the tool carrier has a rectangular slot 69 passing through it and extending to within but a short distance of its upper end into which extends a projection 70 of the main body portion of the tool carrier. A lead screw 71 is rotatably mounted in the upper slot-defining end of the supporting member, is threaded through projection 70 of the tool carrier, and has its lower extremity rotatably mounted in a recess in the section of the supporting member forming the base of the slot. A handle or crank 71' is secured by a bolt or nut to the upper end of the lead screw to facilitate its rotation for adjustment. A collar 72 is mounted on and non-rotatably secured to the lead screw by a set screw at a point just below and adjacent the lower face of that portion of the supporting member which defines the upper extremity of the slot to prevent longitudinal displacement of the lead screw. The projection 70 which extends into the slot is further maintained against withdrawal by a securing plate 73 secured to its outer face by screws 73'. The side edges of the plate overlap the lateral edges of the slot to prevent it from being drawn therethrough when the projection 70 of the tool carrier tends to be withdrawn due to the weight of the carrier. In order to obtain a steadier and more accurate supporting of the tool carrier, grooves 74 and 75 are formed in the inner face of the vertical supporting member and extend longitudinally thereof to receive tongues 76 and 77 formed on other projecting portions 78 and 79 of the tool carrier lying generally parallel to the main projection 70. Therefore, when screws 73' are taken up tightly the tool carrier body is rigidly and securely held by the supporting member with plate 73 bearing tightly against the outer face of the supporting member while projections 78 and 79 bear firmly against its inner face. Thus, any possible twisting of the tool carrier due to pressure brought to bear on it during a milling operation is prevented and an accurate and adjustable mounting of the tool carrier is obtained.

The tool carrier housing comprises three parts; a main body portion 80, a removable top cover portion 81 and a removable front cover portion 82, with the top cover portion being secured to the body portion by screws 83, and the front cover portion being secured to the body portion by screws 84. The housing houses all of the gears, shafts and bearings for supporting and driving the various forms of milling tools which it may be desired to use.

A worm 86 is journaled in ball bearings 89 and 90 held in recesses formed half in the upper section of the casing body portion and half in the top cover portion of the case. The worm receives driving power through the universal joint from the driving means of the lathe in the manner set forth below and transmits this power to the drive shafts 92 and 93 of the tool carrier through worm gears 94 and 95 secured, respectively, to the drive shafts.

As shown in Fig. 8, shaft 92 is journaled in a ball bearing 97 at its upper end and in an elongated bearing 98, such as a bronze bearing, at its lower end and is maintained in position and prevented from dropping or working out of its bearing members by a collar 99 pinned to it at a point just above the lower bearing member. Both the ball bearing and the elongated bearing for shaft 92 are press fitted into their respective recesses in the top cover portion and the main body portion of the tool carrier casing against dropping out of place. A milling tool 100, shown in Fig. 8 as a keyway cutter, though others may be equally as readily used, is mounted upon the lower end of shaft 92 by a nut 101. Both the worm gear and the milling tool are mounted on and securely fixed to the shaft against relative motion. Thus, the driving force is transmitted from the worm, through the worm gear and the shaft to the milling tool without loss due to lost motion. Should it be desired to remove the worm gear and shaft assembly from the tool carrier casing it is only necessary to remove the tool from the lower end of the shaft and the top cover portion from the main body portion of the casing.

Drive shaft 93 and worm gear 95 are shown most clearly in Fig. 9. This shaft is journaled in ball bearings 102 and 103 each press fitted respectively in the main body portion and the top cover portion of the casing. A driving pinion 104 is firmly secured to the lower end of the drive shaft and receives its driving force from the worm through the worm gear and shaft. This shaft assembly is removable from the casing when the pinion has been taken off and the top cover portion removed.

An end mill 105 or similar milling tool, as best shown in Figs. 7 and 10, is mounted for rotation in a lower section of the tool carrier formed by the main body portion and the front cover portion of the casing and has its end opposite its milling end formed with a flat projection 106. A tubular tool-receiving member 107 which carries the end mill is journaled adjacent its ends by ball bearings 108 and 109 which fit in recesses 110 and 111, respectively, formed when the front cover portion has been secured to the main body portion of the tool carrier casing. One end of the tubular member is entirely open for insertion of the end mill while the other end is closed except for a slot 112 which receives the flat end projection 106 of the end mill when it has been inserted into the tubular member. The slotted end of the tubular member has external threads machined on it to receive a threaded cap member 113. The end mill is adapted to fit quite snugly into the tubular member and is prevented from rotating relatively to the tubular member both by the friction of the fit between it and the tubular member and the non-rotatable fitting of its flatted end within the end slot of the tubular member. For removal of the end mill from its tubular supporting member, in the event it becomes tightly stuck therein and mere grasping of the cutting end will not accomplish removal, the threaded cap may be screwed farther on to the supporting member, its inner face thus abutting the end of the end mill and forcing it forwardly out of the supporting member.

A cylindrical driving gear member 115 is mounted on the tubular tool supporting member and held thereon against rotation relative to the supporting member by a key 116. This fit is sufficiently loose to permit the gear member to be shifted longitudinally of the tubular member for reasons hereinafter set forth. Oppositely faced beveled gear portions 117 and 118 extend outwardly from the peripheral end portions of the gear member and may be selectively meshed with and driven by the driving pinion 104 which is mounted upon the lower end of the drive shaft 93. A guide channel 119 is also formed on the outer periphery of the cylindrical gear member and between the beveled gear portions.

The longitudinal motion of the cylindrical gear member relative to the tubular tool supporting member is accomplished by a shifter 120 which when shifted in one direction causes one of the beveled gear portions of the cylindrical gear member to engage the driving pinion and to rotate the milling tool in a clockwise direction and when shifted in the other direction causes the other beveled gear portion of the cylindrical gear member to engage the driving pinion and to rotate the milling tool in a counterclockwise direction. The shifter may also be so adjusted as to shift the cylindrical member to a position at which neither of its beveled gear portions is in engagement with the driving pinion, in which case the cylindrical gear member remains stationary and is not driven at all.

The shifter 120 comprises a shaft 121 rotatably journaled in the front cover portion of the tool carrier, an arm 122 relatively non-rotatably secured to the end of the shaft within the casing and having a pin 123 extending from one end into the guide channel 119 of the cylindrical gear member, and a manually-operable crank 124 non-rotatably secured to the outer end of the shaft. A handle 125 is mounted on the crank 124 in the same manner in which the handle of the indexing crank of the steady-rest is mounted on the worm shaft of the steady rest and contains a projecting pin 126 adapted to be received by holes 127, 128 and 129 formed in the face of the front cover portion of the tool carrier casing. When the crank is adjusted so that the pin 123 is received by hole 127, bevel gear portion 118 of the cylindrical gear member 115 engages the driving pinion 104 and causes rotation of the milling tool in one direction. When the crank is so adjusted that the pin 123 is received by hole 129, as shown in Fig. 7, bevel gear portion 117 of the cylindrical gear member engages the driving pinion and the tool is caused to rotate in the opposite direction. But when pin 123 is received by hole 128 the cylindrical gear member is shifted to a position at which both the beveled gear portions 117 and 118 disengage from the driving beveled gear and no rotation of the milling tool takes place.

While the milling attachment is normally used with only one tool carried by the tool carrier during any particular operation it will be noted that both the drive shafts 92 and 93 are constantly rotating. However, as pointed out above, the cylindrical driving gear member 115 may be positioned so as to remain stationary during the use of the attachment for purposes accomplished by the tool carried by drive shaft 92.

Referring now particularly to Fig. 1 of the drawings, the tool carrier generally indicated by the numeral 17 receives its driving power from the lathe driving means (not shown) through the lathe spindle 22 and face plate 23. A bearing member 131 is mounted on one side of the steady-rest portion 14 of the milling attachment and has a drive shaft 132 mounted therein. A spur gear 133 is mounted upon the end of shaft 132 adjacent the face plate of the lathe and engages the spur gear 24 and is thereby caused to rotate, in turn rotating the drive shaft 132, when the face plate of the lathe rotates. A telescopic connecting drive shaft comprising a shaft 134 freely insertable in and removable from a telescopic spleen 135 which connects the drive shaft carried by the steady-rest to the worm shaft of the tool carrier through universal joints 136 and 136' and thus transmits the driving power to the tool carrier. Such a driving connection permits almost unlimited relative positioning of the tool carrier with respect to the steady-rest and relative to a work piece carried in the lathe. It should be understood that the length of the drive shaft 132 will depend upon the position of the steady rest with respect to the lathe face plate. For example, if the work piece to be milled is long and thin it may need support generally centrally of its length during the milling operation. In which case the steady-rest may be adjusted and positioned on the lathe bed adjacent this central location. Thus it is obvious that the length of the drive shaft 132 carried by the steady-rest bearing member 131 will necessarily have to be of greater length than that shown.

When it is desired to use the attachment, the steady-rest is first mounted upon the lathe bed and centered transversely of it. The indexing and supporting portion of the steady-rest is next positioned vertically so that the cylindrical work supporting member is centered concentrically with the lathe centers. A work piece is then mounted between the head and tail centers of the lathe, the set screws 51 of the cylindrical member are taken up to abut it and the dog is mounted on the work piece and has its tail secured in the slot in the peripheral end face of the cylindrical member. If the tool carrier has not previously been mounted on the lathe it is now mounted thereon, the shaft 134 being inserted into the telescopic spleen 135. As has been indicated, the tool carrier is adjustable both longitudinally and transversely of the lathe. Therefore, it may now be adjusted to position the tool it carries for whichever milling operation is to be performed.

While the tool carrier itself is removed from the lathe during lathe operations, the steady-rest may be left mounted on the lathe during such operations depending upon the nature of the particular operation being performed. However, it is obvious that it too may be removed at will.

It should be clearly understood that various modifications may be made in the disclosed apparatus without departing from the invention or scarificing the advantages thereof, and the scope of the invention is not limited except to the extent set forth in the appended claims.

I claim:

1. A milling attachment for lathes comprising a supporting member mountable on a lathe bed, means carried by said supporting member for auxiliarly supporting a work piece primarily supported between the centers of a lathe, other means carried by said supporting member for indexing a work piece supported between the lathe centers, a tool carrier mountable on the tool rest portion of the lathe carriage, and means carried by the auxiliary work-supporting means for transmitting driving power to the tool carrier from the live spindle of the lathe.

2. A milling attachment for lathes as defined in claim 1 in which the means for indexing and auxiliarly supporting the work piece is adjustable longitudinally of the lathe bed.

3. A milling attachment for lathes as defined in claim 1 in which the means for indexing and auxiliarly supporting the work piece is vertically adjustable.

4. A milling attachment for lathes as defined in claim 1 in which the tool carrier is vertically adjustable.

5. A milling attachment for lathes comprising a supporting member mountable on a lathe bed, means carried by said supporting member for auxiliarly supporting a work piece primarily supported between the centers of a lathe, other means carried by said supporting member for indexing a work piece supported between the lathe centers, a tool carrier mountable on the tool rest portion of the lathe carriage, a bearing member carried by the auxiliary work-supporting means, a drive shaft carried by said bearing member, means for driving said drive shaft from the live spindle of the lathe, and means for transmitting driving power from the drive shaft to the tool carrier.

6. A milling attachment for lathes as defined in claim 5 in which the means for transmitting driving power from the drive shaft to the tool carrier is a telescopic shaft.

7. A milling attachment for lathes as defined in claim 6 in which the opposite ends of the telescopic shaft are connected by universal joints to the bearing supported drive shaft and to a drive shaft of the tool carrier respectively.

8. In a milling attachment for lathes, a steady-rest member comprising a supporting member adapted to be mounted on a lathe bed, means carried by said supporting member for auxiliarly supporting a work piece primarily supported between centers of a lathe, means incorporated in and carried by said auxiliary work-supporting means for indexing said work piece, and a drive shaft bearing means carried by said auxiliary work-supporting means.

9. In a milling attachment for lathes, a steady-rest member as defined in claim 8 in which the supporting member is also adjustable longitudinally of the lathe bed.

10. In a milling attachment for lathes, a steady-rest member as defined in claim 8 in which the auxiliary work-supporting means is vertically adjustable on the supporting member.

11. In a milling attachment for lathes, a steady-rest member as defined in claim 8 in which the auxiliary work-supporting means comprises a hollow cylindrical member having a peripheral protruding portion formed as a worm gear, and other hollow generally cylindrical members each generally surrounding a portion of the above-mentioned hollow cylindrical member and partially overlying the worm gear portion thereof and adapted to clamp between them said hollow cylindrical member, each abutting one opposite lateral surface of the worm gear protruding portion and adapted to be secured together in such condition, one of said last-mentioned hollow substantially cylindrical members being further adapted to be secured to the supporting member mounted upon the lathe bed.

12. In a milling attachment for lathes, a steady-rest member as defined in claim 11 in which the hollow substantially cylindrical member which is adapted to be secured to the supporting member mounted on the lathe bed is secured thereto so as to be adjustable vertically thereon.

13. In a milling attachment for lathes, a steady-rest member as defined in claim 12 in which the means, incorporated in and carried by the auxiliary work-supporting means, for indexing the work piece comprises a worm carried by a worm shaft journalled in upwardly extending portions of the hollow substantially cylindrical clamping members and so journalled therein as to have its teeth mesh with the teeth of the worm gear portion of the hollow cylindrical member, one end of the worm shaft extending through and outwardly from one pair of said upwardly extending portions, a crank mounted on said end of the worm shaft, means for turning said shaft through a predetermined angle by said crank, and means securable to the work piece and firmly connectable to the hollow cylindrical member whereby the work piece is rotated when the hollow cylindrical member is rotated by the worm.

14. In a milling attachment for lathes, a steady-rest member as defined in claim 13 in which the means for rotating the work piece is a dog removably securable to the work piece mounted in the lathe and having one end adapted to be securely held in a groove in one end face of the hollow cylindrical member.

15. In a milling attachment for lathes, a tool carrier comprising a supporting member mountable on the tool rest portion of a lathe carriage, a housing mounted upon said supporting member for vertical adjustment and comprising a plurality of separate sections secured to one another and provided at their meeting surfaces with a plurality of pairs of opposed recesses, each pair of which forms a bearing, a pair of tool-supporting and driving means, each rotatably mounted in a pair of bearings formed by said pairs of opposed recesses of the housing sections, a drive shaft in said housing mounted in bearings formed by pairs of said opposed recesses, means for driving each tool-supporting and driving means from said drive shaft, and means for selectively causing one of the tool-supporting means to be driven in a clockwise and counter-clockwise direction.

16. In a milling attachment for lathes, a tool carrier comprising a supporting member mountable on the tool rest portion of a lathe, a housing mounted upon said supporting member, a worm mounted in said housing, said worm being operatively connectable to the power source of the lathe, a pair of drive shafts mounted in said housing, worm gears mounted on each of said drive shafts and meshing with said worm, a tubular member adapted to relatively non-rotatably receive a milling tool shank, a bevel gear mounted on one of said drive shafts, a casing member relatively non-rotatably mounted on said tubular member, bevel-gear portions carried by said casing member to receive driving power from the bevel gear mounted on said one of said drive shafts, the other of said drive shafts having one end extending through the housing to receive upon it a second milling tool.

17. In a milling attachment for lathes, a tool carrier as defined in claim 16 in which the bevel-gear portions carried by the casing member are oppositely faced and may be driven selectively by the bevel gear mounted on said one of said drive shafts, and means for selectively placing said bevel-gear portions in operating engagement with said bevel-gear.

18. In a milling attachment for lathes, a tool carrier as defined in claim 16 in which the tubular member has an opening in its end, opposite to that which initially receives the tool shank, adapted to allow the end of said shank to pass therethrough, said end of the tubular member being externally threaded, and a cap which when threaded on said end will abut said shank end, when said shank is in place within said tubular member, and begin to force it out therefrom.

19. A milling attachment for lathes comprising a supporting member mountable on a lathe bed, means carried by said supporting member for auxiliarly supporting a work piece primarily supported between the centers of a lathe, other means carried by said supporting member for indexing a work piece supported between the lathe centers, a second supporting member mountable on the tool rest portion of the lathe carriage, a housing mountable upon said second supporting member, multiple tool driving and supporting means carried within said housing, means for selectively causing one of the tool driving means to rotate in either a clockwise or counter-clockwise direction, and means carried by said first supporting member for transmitting driving power from the live spindle of the lathe to said multiple tool-driving means.

20. A milling attachment for lathes comprising a supporting member adapted to be mounted on a lathe bed, means carried by said supporting member for auxiliarly supporting a work piece primarily supported between centers of a lathe, means incorporated in and carried by said auxiliary work-supporting means for indexing said work piece, a tool carrier mountable on the tool rest portion of the lathe carriage, and means including a drive shaft bearing member carried by said auxiliary work-supporting means for transmitting driving power to the tool carrier from the live spindle of the lathe.

21. A milling attachment for lathes comprising a supporting member adapted to be mounted on a lathe bed, means carried by said supporting member for auxiliarly supporting a work piece primarily supported between centers of a lathe, means incorporated in and carried by said auxiliary work-supporting means for indexing said work piece, a second supporting member mountable on the tool rest portion of the lathe carriage, a housing mountable upon said second supporting member, multiple tool driving and supporting means carried within said housing, means for selectively causing one of the tool driving means to rotate in either a clockwise or counter-clockwise direction, and means including a drive shaft bearing member carried by said auxiliary work-supporting means for transmitting driving power to the tool driving means from the live spindle of the lathe.

22. A milling attachment for lathes comprising a supporting member adapted to be mounted on a lathe bed, a hollow cylindrical member for auxiliarly supporting a work piece primarily supported between centers of a lathe and having a peripheral protruding portion formed as a worm gear, other hollow generally cylindrical members each generally surrounding a portion of the above-mentioned hollow cylindrical member and partially overlying the worm gear portion thereof and adapted to clamp between them said hollow cylindrical member, each abutting one opposite lateral surface of the worm gear protruding portion and adapted to be secured together in such condition, one of said last-mentioned hollow substantially cylindrical members being further adapted to be secured to the supporting member mounted on the lathe bed, means incorporated in and carried by said hollow substantially cylindrical members for indexing the auxiliary work-supporting hollow cylindrical member and in turn the work piece, a second supporting member mountable on the tool rest portion of the lathe carriage, a housing mounted upon said second supporting member, multiple tool driving and supporting means carried within said housing, and means carried by said auxiliary work-supporting hollow cylindrical member for transmitting driving power from the live spindle of the lathe to the tool driving means.

23. A milling attachment for lathes as defined in claim 22 in which the means for indexing the auxiliary work-supporting hollow cylindrical member and in turn the work piece comprises a worm carried by a worm shaft journalled in upwardly extending portions of the hollow substantially cylindrical clamping members and so journalled therein as to have its teeth mesh with the teeth of the worm gear portion of the hollow cylindrical member, one end of the worm shaft extending through and outwardly from one pair of said upwardly extending portions, a crank mounted on said end of the worm shaft, means for turning said shaft through a predetermined angle by said crank, and means securable to the work piece and firmly connectable to the hollow cylindrical member, whereby the work piece is rotated when the hollow cylindrical member is rotated by the worm.

24. A milling attachment for lathes as defined in claim 22 in which the tool driving means comprises a worm, drive shafts, worm gears mounted on said drive shafts and engaging said worm so that said drive shafts are driven by said worm, a tubular member located at one end of one of said drive shafts and adapted to relatively non-rotatably receive a milling tool shank, a bevel gear on said end of said drive shaft, a casing member relatively non-rotatably mounted on said tubular member, bevel-gear portions protruding from said casing member by which it may receive driving power from the bevel gear mounted on the end of said one of said drive shafts, the other of said shafts being adapted to receive directly upon one of its ends a second milling tool.

RANDOLPH SOLOMON.

REFERENCES CITED

The following references are of record in the file of this patent:

UNITED STATES PATENTS

| Number | Name | Date |
|---|---|---|
| 692,033 | Rivett | Jan. 28, 1902 |
| 969,388 | Miles | Sept. 6, 1910 |
| 1,038,571 | Haase | Sept. 17, 1912 |
| 1,052,116 | Wood | Feb. 4, 1913 |
| 1,719,689 | Buehrle | July 2, 1929 |
| 2,455,662 | Dyer | Dec. 7, 1948 |

FOREIGN PATENTS

| Number | Country | Date |
|---|---|---|
| 92,448 | Switzerland | Jan. 2, 1922 |
| 377,069 | Germany | June 9, 1923 |